United States Patent
Kim et al.

(10) Patent No.: US 11,505,723 B2
(45) Date of Patent: Nov. 22, 2022

(54) ADHESIVE COATING COMPOSITION FOR NON-ORIENTED ELECTRICAL STEEL SHEET, AND METHOD FOR MANUFACTURING NON-ORIENTED ELECTRICAL STEEL SHEET

(71) Applicant: POSCO, Pohang-si (KR)

(72) Inventors: Jung-Woo Kim, Pohang-si (KR);
Bongwoo Ha, Pohang-si (KR);
Changhoon Choi, Pohang-si (KR);
Taeyoung No, Pohang-si (KR);
Heon-Jo Choi, Pohang-si (KR);
Won-Seog Bong, Pohang-si (KR)

(73) Assignee: POSCO, Pohang-si (KR)

( * ) Notice: Subject to any disclaimer, the term of this patent is extended or adjusted under 35 U.S.C. 154(b) by 345 days.

(21) Appl. No.: 16/473,033

(22) PCT Filed: Dec. 22, 2017

(86) PCT No.: PCT/KR2017/015385
§ 371 (c)(1),
(2) Date: Jun. 24, 2019

(87) PCT Pub. No.: WO2018/117750
PCT Pub. Date: Jun. 28, 2018

(65) Prior Publication Data
US 2020/0087549 A1    Mar. 19, 2020

(30) Foreign Application Priority Data

Dec. 23, 2016 (KR) .......................... 10-2016-0178514

(51) Int. Cl.
*C09J 11/04* (2006.01)
*B32B 15/01* (2006.01)
(Continued)

(52) U.S. Cl.
CPC .............. *C09J 11/04* (2013.01); *B32B 15/011* (2013.01); *B32B 37/12* (2013.01); *C09J 5/00* (2013.01);
(Continued)

(58) Field of Classification Search
CPC ... C09J 11/04; C09J 5/00; C09J 123/06; C09J 125/06; C09J 133/04; C09J 161/06;
(Continued)

(56) References Cited

U.S. PATENT DOCUMENTS

| 2013/0203896 A1 | 8/2013 | Xu et al. | |
| 2015/0017428 A1* | 1/2015 | Kim ........................ | C08K 3/32 |
| | | | 428/331 |

FOREIGN PATENT DOCUMENTS

| CN | 101040022 A | 9/2007 |
| CN | 101517015 A | 8/2009 |

(Continued)

OTHER PUBLICATIONS

International Search Report dated Apr. 6, 2018 issued in corresponding International Patent Application No. PCT/KR2017/015385.

(Continued)

*Primary Examiner* — Daniel H Lee
(74) *Attorney, Agent, or Firm* — Morgan, Lewis & Bockius LLP

(57) ABSTRACT

The present invention has been made in an effort to provide an adhesive coating composition capable of adhering (fastening) a non-oriented electrical steel sheet without using a conventional fastening method such as welding, clamping, or interlocking, a non-oriented electrical steel sheet stack to which the same is applied, and a manufacturing method thereof. According to an exemplary embodiment of the present invention, an adhesive coating composition
(Continued)

includes: 40 to 99 wt % of a first component containing a water-soluble resin; and 1 to 60 wt % of a second component containing a composite metal phosphate.

3 Claims, 5 Drawing Sheets

(51) Int. Cl.
| | |
|---|---|
| *B32B 37/12* | (2006.01) |
| *C09J 5/00* | (2006.01) |
| *C09J 123/06* | (2006.01) |
| *C09J 125/06* | (2006.01) |
| *C09J 133/04* | (2006.01) |
| *C09J 161/06* | (2006.01) |
| *C09J 163/00* | (2006.01) |
| *C09J 175/04* | (2006.01) |
| *C09J 183/04* | (2006.01) |
| *H01F 1/16* | (2006.01) |

(52) U.S. Cl.
CPC ............ *C09J 123/06* (2013.01); *C09J 125/06* (2013.01); *C09J 133/04* (2013.01); *C09J 161/06* (2013.01); *C09J 163/00* (2013.01); *C09J 175/04* (2013.01); *C09J 183/04* (2013.01); *B32B 2307/208* (2013.01); *C09J 2400/166* (2013.01); *C09J 2423/04* (2013.01); *C09J 2425/00* (2013.01); *C09J 2433/00* (2013.01); *C09J 2461/00* (2013.01); *C09J 2463/00* (2013.01); *C09J 2475/00* (2013.01); *C09J 2483/00* (2013.01); *H01F 1/16* (2013.01)

(58) Field of Classification Search
CPC ...... C09J 163/00; C09J 175/04; C09J 183/04; C09J 2400/166; C09J 2423/04; C09J 2425/00; C09J 2433/00; C09J 2461/00; C09J 2463/00; C09J 2475/00; C09J 2483/00; C09J 5/06; B32B 15/011; B32B 37/12; B32B 2307/208; H01F 1/16; B05D 3/00; B05D 7/14; B05D 3/007; C08K 3/32; C08K 2003/321; C22C 38/02
See application file for complete search history.

(56) References Cited

FOREIGN PATENT DOCUMENTS

| | | | |
|---|---|---|---|
| CN | 101643625 A | 2/2010 | |
| CN | 101857761 A | 10/2010 | |
| CN | 102433055 A | 5/2012 | |
| CN | 104025207 A | 9/2014 | |
| CN | 105765106 A | 7/2016 | |
| CN | 108473819 A | 8/2018 | |
| EP | 2623566 A1 | 8/2013 | |
| EP | 2800103 A1 | 11/2014 | |
| EP | 3395923 A1 | 10/2018 | |
| JP | 2000-129455 A | 5/2000 | |
| JP | 2008-266444 A | 11/2008 | |
| JP | 2009-545674 A | 12/2009 | |
| JP | 4460312 B2 | 5/2010 | |
| JP | 4571838 B2 | 10/2010 | |
| JP | 2012-046825 A | 3/2012 | |
| JP | 2013-540199 A | 10/2013 | |
| JP | 5494602 B2 | 5/2014 | |
| JP | 5494602 B2 * | 5/2014 | ............. C09J 11/04 |
| JP | 2015-509994 A | 4/2015 | |
| JP | 2019-508573 A | 3/2019 | |
| KR | 10-0762466 B1 | 10/2007 | |
| KR | 10-0886236 B1 | 3/2009 | |
| KR | 10-1247481 B1 | 3/2013 | |
| KR | 10-2013-0076642 A | 7/2013 | |
| KR | 10-2014-0012363 A | 2/2014 | |
| KR | 10-1481127 B1 | 1/2015 | |
| KR | 10-1728027 B1 | 4/2017 | |
| KR | 10-2017-0074110 A | 6/2017 | |
| KR | 10-2017-0075527 A | 7/2017 | |
| WO | 2008/016220 A1 | 2/2008 | |

OTHER PUBLICATIONS

Chinese Search Report in the Chinese Office Action dated Jun. 19, 2020 issued in Chinese Patent Application No. 201780080223.5.
Indian Office Action dated Jun. 26, 2020 issued in Indian Patent Application No. 201947029045.
Extended European Search Report dated Jan. 15, 2020 issued in European Patent Application No. 17885046.7.
Chinese Office Action dated Sep. 13, 2021 issued in Chinese Patent Application No. 201780080223.5.
Z. Xin-li, et al., "Research on the properties of nanoparticles modified sodium silicate adhesive," Advanced Materials Research, vol. 557-559, Jul. 30, 2012, pp. 1825-1829 (first page only).
C. Shuangjie, et al., "Surface Insulation Coating of Non-Oriented Silicon Steel," Jan. 1998 (partial English translation).
European Communication dated Feb. 9, 2022 issued in European Patent Application No. 17885046.7.

* cited by examiner

ADHESIVE COATING COMPOSITION FOR NON-ORIENTED ELECTRICAL STEEL SHEET, AND METHOD FOR MANUFACTURING NON-ORIENTED ELECTRICAL STEEL SHEET

CROSS-REFERENCE OF RELATED APPLICATIONS

This application is the U.S. National Phase under 35 U.S.C. § 371 of International Patent Application No. PCT/KR2017/015385, filed on Dec. 22, 2017, which in turn claims the benefit of Korean Patent Application No. 10-2016-0178514, filed Dec. 23, 2016, the entire disclosures of which applications are incorporated by reference herein.

TECHNICAL FIELD

This relates to an adhesive coating composition for a non-oriented electrical steel sheet, a non-oriented electrical steel sheet product, and a manufacturing method thereof.

BACKGROUND ART

A non-oriented electrical steel sheet is a steel sheet of which a magnetic property thereof is uniform in all directions on a rolling plate, and is widely used for a motor, an iron core of an electric generator, an electric motor, a small transformer, and the like.

The non-oriented electrical steel sheet may be divided into two types, such as one in which stress-removing annealing (SRA) for improving the magnetic property after punching work should be practiced, and the other in which the SRA is omitted if a cost loss is larger than the effect of the magnetic property by the SRA.

An insulation film is a film coated in a finishing manufacturing process of a product such as a motor, an iron core of a generator, an electric motor, a small transformer, etc., and it is usually required to have electrical characteristics that suppress generation of eddy currents. In addition, continuous punching workability, anti-stickiness, and surface close contacting property are required. The continuous punching workability indicates an ability to suppress the wear of a mold when a plurality of films are stacked into an iron core after a punching process is performed to have a predetermined shape.

The anti-stickiness indicates an ability of not allowing iron core steel sheets to closely stick to each other after a stress relief annealing process for relieving machining stress of a steel sheet to recover a magnetic characteristic.

In addition to such basic characteristics, excellent application workability of a coating solution, solution stability such that it is usable for a long period after mixing, and the like are also required. It is required to use an additional fastening method such as welding, clamping, or interlocking when the insulation film is manufactured as a non-oriented electrical steel sheet product.

On the other hand, attempts have been made to perform such fastening by using thermal coalescence of an adhesive solution applied on a surface of the non-oriented electrical steel sheet without using a conventional fastening method such as welding, clamping, or interlocking. Adhesive coatings developed for this purpose are composed mainly of organic materials.

However, in the stress relief annealing process, an organic material is decomposed at a high temperature, and thus surface characteristics (insulation, attachment, corrosion resistance, etc.) of an organic adhesive coating composition deteriorate, and also adherence (fastening force) of each electrical steel sheet is almost lost.

DISCLOSURE

The present invention has been made in an effort to provide an adhesive coating composition that is capable of adhering (fastening) a non-oriented electrical steel sheet without using a conventional fastening method such as welding, clamping, or interlocking, a non-oriented electrical steel sheet product to which the same is applied, and a manufacturing method thereof.

An exemplary embodiment of the present invention provides an adhesive coating composition that is capable of maintaining adherence even after a stress relief annealing process, a non-directional electrical steel sheet product to which the same is applied, and a manufacturing method thereof.

According to an exemplary embodiment of the present invention, an adhesive coating composition for a non-oriented electrical steel sheet includes: 40 to 99 wt % of a first component containing a water-soluble resin containing an aromatic group; and 1 to 60 wt % of a second component containing a composite metal phosphate.

The first component may include at least one selected from an epoxy-based resin, a siloxane-based resin, an acrylic-based resin, a phenol-based resin, a styrene-based resin, a vinyl-based resin, an ethylene-based resin, and a urethane-based resin. The second component may include at least one selected from a primary aluminum phosphate $(Al(H_3PO_4)_3)$, a primary cobalt phosphate $(Co(H_3PO_4)_2)$, a primary calcium phosphate $(Ca(H_3PO_4)_2)$, a primary zinc phosphate $(Zn(H_3PO_4)_2)$, and a primary magnesium phosphate $(Mg(H_3PO_4)_2)$.

The water-soluble resin may include at least one functional group selected from benzene, toluene, xylene, naphthalene, anthracene, and benzopyrene.

A solid content of the water-soluble resin in the first component may be 50 wt %, and the water-soluble resin may have a weight average molecular weight of 1000 to 100,000 and a softening point (Tg) of 30 to 150° C.

According to an exemplary embodiment of the present invention, a manufacturing method of a non-oriented electrical steel sheet product includes: preparing an adhesive coating composition; forming an adhesive coating layer by coating the adhesive coating composition on a surface of a non-directional electric steel sheet and then curing it; forming a thermally coalesced layer by stacking and thermally coalescing a plurality of non-oriented electrical steel sheets each of which includes the adhesive coating layer formed therein; and forming an adhesive layer by performing stress relief annealing on the thermally coalesced non-oriented electrical steel sheets.

The forming of the adhesive coating layer may be performed for 5 to 40 seconds in a temperature range of 200 to 600° C.

A thickness of the adhesive coating layer may be in a range of 0.5 to 10 µm in the forming of the adhesive coating layer.

The thermal coalescence may be performed under conditions of a temperature of 120 to 300° C., a pressure of 0.1 to 5.0 Mpa, and a time period of 0.1 to 180 min in the forming of the thermally coalesced layer.

The forming of the adhesive layer may be performed at a temperature of 500 to 900° C. for 60 to 180 minutes.

The forming of the adhesive layer may be performed in a nitrogen ($N_2$) gas atmosphere.

The forming of the adhesive layer may be performed in a mixed gas atmosphere of 0.1 to 10 vol % of hydrogen ($H_2$) and 90 to 99.9 vol % of nitrogen ($N_2$).

The forming of the adhesive layer may be performed in a modified gas atmosphere containing 10 to 30 vol % of liquefied natural gas (LNG) and 70 to 90 vol % of air.

According to the exemplary embodiments of the present invention, oil resistance, close contacting property, corrosion resistance, and insulation of the adhesive coating layer itself may be improved, and adherence, scratch resistance, weather resistance, weldability, and oil resistance at a high temperature may be improved in adhering different non-oriented electrical steel sheets.

According to the exemplary embodiments of the present invention, a non-oriented electrical steel sheet may be adhered without using a conventional fastening method such as welding, clamping, or interlocking, thereby further increasing a magnetic property of a non-oriented electrical steel sheet product.

MODE FOR INVENTION

Figure 1:
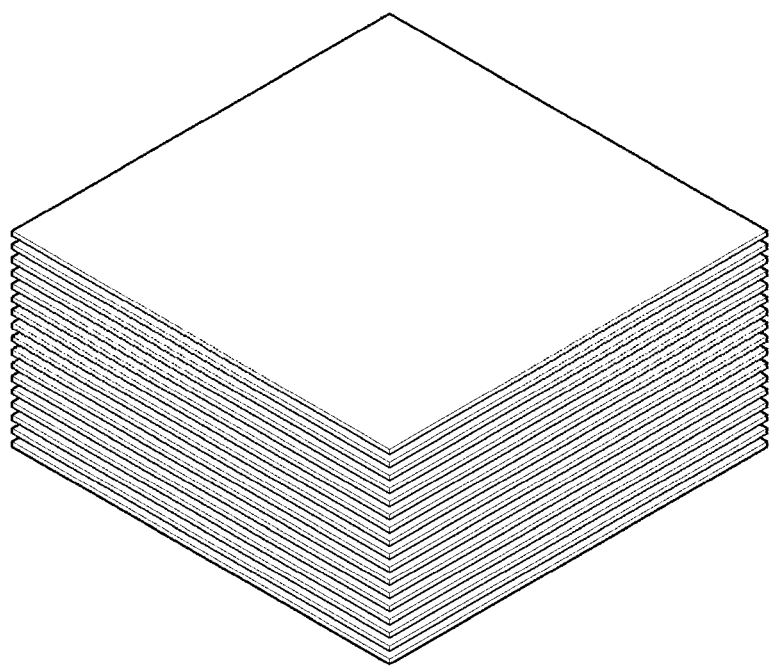
FIG. 1 illustrates a schematic view of a non-oriented electrical steel sheet product.

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first component, constituent element, or section described below may be referred to as a second component, constituent element, or section, without departing from the range of the present invention.

The terminologies used herein are used just to illustrate a specific exemplary embodiment, but are not intended to limit the present invention. It must be noted that, as used in the specification and the appended claims, singular forms used herein include plural forms unless the context clearly dictates the contrary. It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

When referring to a part as being "on" or "above" another part, it may be positioned directly on or above the other part, or another part may be interposed therebetween. In contrast, when referring to a part being "directly above" another part, no other part is interposed therebetween.

Unless defined otherwise, all terms including technical and scientific terms used herein have the same meanings as those commonly understood by one of ordinary skill in the art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

An exemplary embodiment of the present invention provides an adhesive coating composition for a non-oriented electrical steel sheet, a non-oriented electrical steel sheet product, and a manufacturing method thereof.

According to an exemplary embodiment of the present invention, an adhesive coating composition for a non-oriented electrical steel sheet includes: 40 to 99 wt % of a first component containing a water-soluble resin; and 1 to 60 wt % of a second component containing a composite metal phosphate.

Hereinafter, each component thereof will be described in detail.

The first component contains a water-soluble resin. The first component basically includes the water-soluble resin to prevent precipitation or agglomeration of the composite metal phosphate included as the second component, and contributes to improving the surface characteristics after stress relief annealing.

Specifically, the water-soluble resin may include at least one selected from an epoxy-based resin, a siloxane-based resin, an acrylic-based resin, a phenol-based resin, a styrene-based resin, a vinyl-based resin, an ethylene-based resin, and a urethane-based resin. At this time, heat resistance of the adhesive coating layer can be improved by selecting one of the water-soluble resins or a mixture of two or more thereof exemplified above as the first component. In other words, the first component contributes to improving the insulation, heat resistance, surface characteristics, etc. of the adhesive coating layer.

The water-soluble resin may contain an aromatic hydrocarbon functional group. Specifically, the water-soluble resin may include at least one functional group selected from benzene, toluene, xylene, naphthalene, anthracene, and benzopyrene. When the aromatic hydrocarbon functional group is contained, aromatic hydrocarbons are not pyrolyzed even at a high temperature, which is advantageous in terms of maintaining a bonding force even after the stress relief annealing process.

In the first component, a weight average molecular weight of the water-soluble resin is in a range of 1000 to 100,000, and a number average molecular weight thereof is in a range of 1000 to 40,000. When each of the weight average molecular weight and the number average molecular weight is lower than a lower limit, physical properties of the adhesive coating layer such as hardenability and strength may be lowered, and when each of the weight average molecular weight and the number average molecular weight is higher than an upper limit, phase separation in the water-soluble resin may occur, and the compatibility with the metal phosphate may be deteriorated.

Specifically, the water-soluble resin may have a weight average molecular weight of 5000 to 30,000.

A softening point (Tg) of the water-soluble resin may be in a range of 30 to 150° C., and a solid fraction (solid content) may be in a range of 10 to 50 wt %. When the softening point (Tg) of the water-soluble resin is more than 150° C., the viscosity of the composition may become too high, to deteriorate the coating workability.

The first component may be contained in a range of 40 to 99 wt %, based on 100 wt % of a total adhesive coating composition. When the content of the first component is too small, precipitation or agglomeration of the composite metal phosphate may occur. When the content of the first component is too large, the content of the composite metal phosphate may be relatively decreased to deteriorate a bonding force of a bonding layer. Accordingly, the first component may be contained in the range mentioned above.

The second component contains the composite metal phosphate.

The phosphate used in the exemplary embodiment of the present invention is represented as a chemical formula "$M_x(H_3PO_4)_y$," and is defined as "complex metal phosphate" in order to distinguish it from a metal phosphate represented by a chemical formula "$M_x(PO_4)_y$."

The "composite metal phosphate" may be prepared using a reaction between a phosphoric acid ($H_3PO_4$) and a metal hydroxide ($M_x(OH)_y$) or metal oxide ($M_xO$). A specific example thereof may include a primary aluminum phosphate ($Al(H_3PO_4)_3$), a primary cobalt phosphate ($Co(H_3PO_4)_2$), a primary calcium phosphate ($Ca(H_3PO_4)_2$), a primary zinc phosphate ($Zn(H_3PO_4)_2$), and a primary magnesium phosphate ($Mg(H_3PO_4)_2$), which are used in the following examples.

The composite metal phosphate contained as the second component contributes to adherence at a high temperature by thermal coalescence, oil resistance at a high temperature, and adherence after stress relief annealing, and may be mixed with the first component at an appropriate ratio. Accordingly, the adhesive coating composition becomes an organic/inorganic composite composition.

As mentioned briefly above, the composite metal phosphate is represented as the chemical formula $M_x(H_3PO_4)_y$, and is distinguished from the metal phosphate represented by the chemical formula $M_x(PO_4)_y$. One of these composite metal phosphates as a mixture of two or more thereof may be included in the second component.

As mentioned briefly above, the composite metal phosphate contained as the second component may be prepared by using the reaction between the metal hydroxide ($M_x(OH)_y$) or the metal oxide ($M_xO$), and the phosphoric acid ($H_3PO_4$).

For example, the metal hydroxide ($M_x(OH)_y$) or the metal oxide ($M_xO$) is injected into 100 wt % of an aqueous phosphoric acid solution containing 85 wt % of free phosphoric acid ($H_3PO_4$), and reacted at a temperature of 80 to 90° C. for 6 to 10 h, whereby the complex metal phosphate can be obtained.

In this case, as for an injection amount of the metal hydroxide ($M_x(OH)_y$) or the metal oxide ($M_xO$), 1 to 40 wt % of aluminum hydroxide ($Al(OH)_3$), 1 to 10 wt % of cobalt hydroxide ($Co(OH)_2$), 1 to 15 wt % of calcium oxide (CaO), 1 to 20 wt % of zinc oxide (ZnO), or 1 to 10 wt % of magnesium oxide (MgO) based on 100 wt % of the aqueous phosphoric acid solution is injected. When these ranges are satisfied, a balance of heat resistance and/or adherence may be maintained.

Considering functions of the first component and the second component, the respective contents may be appropriately used in combination. Specifically, the second component may be contained in a range of 1 to 60 wt %, based on 100 wt % of a total adhesive coating composition. When the second component is contained in a too small amount, the adherence at a high temperature and the oil resistance at a high temperature may be deteriorated. On the other hand, when the second component is contained in a too large amount, adherence may be deteriorated due to aggregation between the composite metal phosphates.

The adhesive coating composition may further include an additive in addition to the first component and the second component.

The additive includes at least one selected from an oxide, a hydroxide, carbon nanotubes (CNT), carbon black, a pigment, and a coupling agent.

As the oxide, one or more of copper oxide (CuO), aluminum oxide ($Al_2O_3$), calcium oxide (CaO), magnesium oxide (MgO), chromium oxide ($CrO_3$), iron oxide ($Fe_2O_3$), boric acid ($H_3BO_3$), phosphoric acid ($H_3PO_4$), zinc oxide (ZnO), and silica ($SiO_2$) may be contained. In particular, colloidal silica including $SiO_2$ having a particle diameter of 3 to 100 nm may be used as the silica. Specifically, a content of $SiO_2$ may be in a range of 10 wt % to 50 wt % in the aqueous solution.

As the hydroxide, one or more of sodium hydroxide (NaOH), aluminum hydroxide ($Al(OH)_2$), magnesium hydroxide ($Mg(OH)_2$), calcium hydroxide ($Ca(OH)_2$), and potassium hydroxide (KOH) may be contained.

As the carbon nanotubes (CNT), those having a diameter of 1 to 15 nm in a width direction which are included in a content of 1 to 20 wt % in the aqueous solution may be used.

As the carbon black, that having a particle diameter of 1 to 20 μm which is included in a content of 5 to 40 wt % in the aqueous solution may be used.

As the pigment, phthalocyanine-based blue and green may be used, and each particle diameter thereof may be in a range of 1 to 30 μm.

As the coupling agent, a silane-based coupling agent may be used, and specifically, 3-glycidoxypropyltrimethoxysilane may be used.

The additive may be contained in a range of 1 to 10 wt %, based on 100 wt % of the total adhesive coating composition. When the above-mentioned range is satisfied, a balance of the heat resistance and/or adherence of the adhesive layer may be maintained, and in particular, adherence after the stress relief annealing process may be remarkably improved. When a content of the additive is too small, the adherence may be deteriorated after the stress relief annealing process. When the content of the additive is too high, the adherence may be deteriorated upon thermal coalescence. Specifically, the additive may be contained in an amount of 3 to 8 wt %.

According to an exemplary embodiment of the present invention, a non-oriented electrical steel sheet product includes: a plurality of non-oriented electrical steel sheets; and a plurality of adhesive layers disposed between the non-directional electrical steel sheets. FIG. 1 illustrates a schematic view of a non-oriented electrical steel sheet product according to an exemplary embodiment of the present invention. As illustrated in FIG. 1, a plurality of non-oriented electrical steel sheets are stacked.

Figure 2:
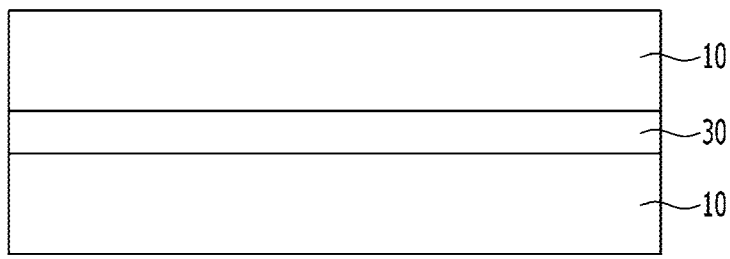
FIG. 2 illustrates a schematic view of a cross-section of a non-oriented electrical steel sheet product according to an exemplary embodiment of the present invention.

FIG. 2 illustrates a schematic diagram of a cross-section of a non-oriented electrical steel sheet product according to an exemplary embodiment of the present invention. As illustrated in FIG. 2, according to the exemplary embodiment of the present invention, the non-oriented electrical steel sheet product 100 includes a plurality of non-oriented electrical steel sheets 10; and adhesive layers 30 disposed between the non-oriented electrical steel sheets.

The non-oriented electrical steel sheet product according to the exemplary embodiment of the present invention may be a product in which different non-oriented electrical steel sheets are thermally coalesced, by forming adhesive layers simply using the above-described adhesive coating composition without using conventional methods such as welding, clamping, and interlocking.

At this time, depending on the characteristics of the above-mentioned adhesive coating composition, the non-oriented electrical steel sheet product is excellent in adherence at a high temperature and oil resistance at a high temperature even after thermal coalescence, and in particular, even though it is a product manufactured through the stress relief annealing, the surface characteristics and adherence are not deteriorated.

Hereinafter, each component thereof will be described in detail.

A general non-oriented electrical steel sheet may be used without limitation as the non-oriented electrical steel sheet 10. In the exemplary embodiment of the present invention, since the adhesive layers 30 are formed between the non-oriented electrical steel sheets 10 to manufacture the non-oriented electrical steel sheet product 100, a detailed description of the non-oriented electrical steel sheets 10 will be omitted.

The adhesive layers 30 are formed between the non-oriented electrical steel sheets 10 and have adherence that is strong enough to adhere the non-oriented electrical steel sheets 10 to each other without using a conventional fastening method such as welding, clamping, and interlocking.

The adhesive layers 30 may be formed by coating a surface of the above-mentioned adhesive coating composition, curing it to form an adhesive coating layer, stacking it to form a thermal coalescing layer, and then removing a stress thereof by annealing. When a plurality of non-oriented electrical steel sheets 10 each of which includes an adhesive coating layer that is formed thereon are stacked and thermally coalesced, resin components in the adhesive coating layers are thermally coalesced to form the thermal coalescing layer. The thermal coalescing layer is formed to include an organic component including C and O, and a component including Al, Co, Ca, Mg, and Zn. When the non-oriented electrical steel sheet product including the thermal coalescing formed thereon is subjected to the stress relief annealing again, the organic component such as a water-soluble resin among components in the adhesive coating composition is decomposed into $CO_2$ or CO. The $CO_2$ or CO is not completely gasified, but is recombined into a carbide form in the adhesive layer 30. Further, O derived from the water-soluble resin and the composite metal phosphate is produced and is grown in an oxide form. N derived from an atmosphere of the stress relief annealing is generated and grown in a nitride form. The carbide, oxide, and nitride produced and grown in this way ensure adherence in the adhesive layer 30.

As such, in the exemplary embodiment of the present invention, each of the adhesive layers 30 contains 10 to 30 wt % of P, 10 to 30 wt % of at least one metal selected from Al, Co, Ca, Zn, and Mg, 10 to 20 wt % of O, 1 to 10 wt % of N, and 1 to 20 wt % of C, and O as a balance.

Phosphorus (P) is derived from the complex metal phosphate in the adhesive coating composition. P should be contained in an appropriate amount to maintain the adherence.

At least one metal selected from Al, Co, Ca, Zn, and Mg is derived from the composite metal phosphate in the adhesive coating composition. One of the aforementioned metals should be contained in an appropriate amount to maintain the adherence. When two or more kinds of the above-mentioned metals are contained, a content of the multiple kinds of metals is included in the above-mentioned range.

C, O, and N are combined with at least one metal selected from P, Al, Co, Ca, Zn, and Mg to produce and grow a carbide, an oxide, or a nitride, thereby securing the adherence in the adhesive layers 30. The C, O, and N should be included within the ranges described above, respectively, to ensure the adherence.

In an exemplary embodiment of the present invention, each adhesive layer may further contain 1 to 30 wt % of at least one of Cu, Cr, Fe, B, Si, Na, and K. These elements are derived from the additive in the adhesive coating composition, and combine with C, O, and N to produce and grow a carbide, an oxide, or a nitride, thereby securing the adherence within the adhesive layers 30.

In the exemplary embodiment of the present invention, the carbide may be $CaC_2$, $Na_2C_2$, $H_2C_2$, $Al_4C_3$, $Mg_2C_3$, SiC, $B_4C$, CO, $CO_2$, or the like, the oxide may be $Na_2O$, $K_2O$, CaO, MgO, $Al_2O_3$, $Fe_2O_3$, CoO, MgO, $Na_2O$, CaO, FeO, $Al_2O_3$, $K_2O$, $SiO_2$, or the like, and the nitride may be $K_3N$, $Mg_3N_2$, $Ca_3N_2$, $Fe_2N$, $Zn_3N_2$, $(CN)_2$, $S_4N_4$, SiN, or the like.

Regarding a cross-sectional area of the adhesive layer 30, an area fraction of the adhesive layer 30 having formed an aggregated body with a particle diameter that is equal to or greater than 30 nm when inorganic components of the adhesive layer 30 are aggregated with each other may be equal to or less than 0.1. The area fraction signifies the area of the aggregated body when an entire area thereof is set to be 1. By the water-soluble resin component in the above-noted adhesive coating composition, the composite metal phosphate and the inorganic component in the additive are uniformly dispersed, and the inorganic component is not aggregated when the stress relief annealing is performed. The inorganic component is not aggregated but is uniformly dispersed, thereby further acquiring adherence in the adhesive layer 30. In the exemplary embodiment of the present invention, the aggregated body signifies a matter that is generated when the above-noted P, Si, Al, Co, Ca, Zn, and Mg have reacted with C, O, and N and have aggregated to each other The adhesive layer 30 may have the fraction of the area occupied by a pore, that is equal to or less than 0.5, with respect to a cross-sectional area of the adhesive layer 30. As the area occupied by the pore is small, when the stress relief annealing is performed, CO and $CO_2$ produced by thermally decomposing the water-soluble organic component are not completely gasified, but are produced in a carbide or oxide form. In further detail, the fraction of the area occupied by the pore may be equal to or less than 0.1. In further detail, the fraction of the area occupied by the pore may be equal to or less than 0.01.

A thickness of the adhesive layer 30 may be 0.5 to 25 μm. When the range is satisfied, the adhesive layer 30 may have excellent surface characteristics (e.g., insulation, corrosion resistance, and close contacting property).

Hardness of the adhesive layer 30 may be equal to or greater than 5 with reference to the Rockwell hardness.

When the hardness is very low, a sticky drawback and a workability drawback may be generated to the surface.

Figure 3:
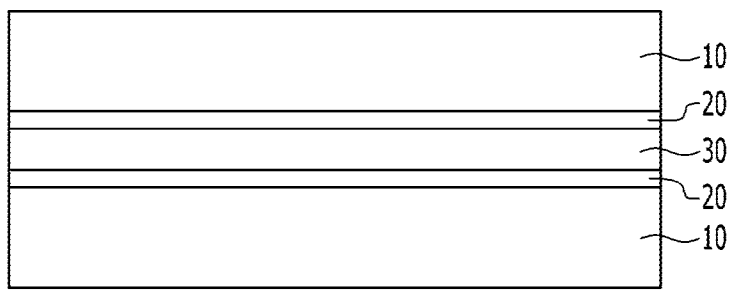
FIG. 3 illustrates a schematic view of a cross-section of a non-oriented electrical steel sheet product according to another exemplary embodiment of the present invention.

FIG. 3 illustrates a schematic diagram of a cross-section of a non-oriented electrical steel sheet product according to another exemplary embodiment of the present invention. As illustrated in FIG. 3, according to the exemplary embodiment of the present invention, the non-oriented electrical steel sheet product 100 includes a plurality of non-oriented electrical steel sheets 10; adhesive layers 30 disposed between the non-oriented electrical steel sheets; and oxide layers 20 disposed between the non-oriented electrical steel sheets 10 and the adhesive layers 20.

Each of the oxide layers 20 produce a dense passivation layer by a high temperature reaction on the inorganic and metal component provided on the coalescing layer and the oxide provided on a base layer in the stress relief annealing process. As the oxide layer 20 is formed, production of an oxide in the electrical steel sheet 10 may be suppressed, and magnetism of the electrical steel sheet product 100 may be further improved.

The oxide layer 20 may contain 5 to 20 wt % of P, 10 to 30 wt % of at least one metal selected from Al, Co, Ca, Zn, and Mg, 10 to 20 wt % of 0, 1 to 10 wt % of N, and 1 to 20 wt % of C, and O as a balance. P is derived from the composite metal phosphate in the adhesive coating composition like the adhesive layer 30. At least one metal selected from Al, Co, Ca, Zn and Mg is derived from the composite metal phosphate in the adhesive coating composition. The oxide layer 20 is distinguished from the adhesive layer 30 in that it hardly contains N and C. In addition, the oxide layer 20 may further include Fe, Si, and the like that are diffused from the electrical steel sheet 10 in the stress relief annealing process.

A thickness of the oxide layer 20 may be 10 to 500 nm

When the oxide layer 20 is very thin, an oxide may be produced in the electrical steel sheet 10, which may apply a bad influence to magnetism. When the oxide layer 20 is very thick, the close contacting property between the oxide layer and the resin layer is not good, so a bonding strength may be deteriorated.

The oxide layer 20 has a greater hardness than the adhesive layer 30. In detail, the hardness of the oxide layer 20 may be equal to or greater than 20 with reference to the Rockwell hardness.

As described above, the formation of the oxide layer 20 suppresses the generation of oxides in the non-oriented electrical steel sheet 10. In detail, the area fraction of the oxide produced within 10 μm in an inner direction of the electrical steel sheet 10 from an interface of the oxide layer 20 and the electrical steel sheet 10 may be equal to or less than 0.05. Further, even when an oxide is produced, its particle diameter is very small, thereby minimizing an influence applied to the magnetism. In detail, the area fraction of the oxide produced within 10 μm in an inner direction of the electrical steel sheet 10 from an interface of the oxide layer 20 and the electrical steel sheet 10 may be equal to or to 5 μm than 0.01.

According to an exemplary embodiment of the present invention, a manufacturing method of non-oriented electrical steel sheet product includes: preparing an adhesive coating composition; forming an adhesive coating layer by coating the adhesive coating composition on a surface of a non-directional electric steel sheet and then curing it; forming a thermally coalesced layer by stacking and thermally coalescing a plurality of non-oriented electrical steel sheets each of which includes the adhesive coating layer formed therein; and forming an adhesive layer by performing stress relief annealing on the thermally coalesced non-oriented electrical steel sheets.

Hereinafter, each step will be described in detail.

First, an adhesive coating composition is prepared. Since the adhesive coating composition has been described above, a repeated description will be omitted.

Next, an adhesive coating layer is formed by coating an adhesive coating composition on a surface of a non-directional electric steel sheet and then curing it. This step can be performed in a temperature range of 200 to 600° C. for curing the adhesive coating composition.

A thickness of the thus-formed coating layer may be 0.5 to 10 μm. When the thickness of the adhesive coating layer is too small, the adherence of the finally formed adhesive layer may not be sufficient. When the thickness of the adhesive coating layer is too thick, the magnetic properties of the electrical steel sheet product may deteriorate.

A thermally coalesced layer is formed by stacking and thermally coalescing a plurality of non-oriented electrical steel sheets each of which includes the adhesive coating layer formed therein. Water-soluble resin components in the adhesive coating layer are thermally coalesced through the thermal coalescence to form the thermally coalesced layer.

The thermal coalescence may be performed under conditions of a temperature of 120 to 300° C., a pressure of 0.1 to 5.0 Mpa, and a time period of 0.1 to 180 min. The above conditions may be independently satisfied, and two or more conditions may be satisfied at the same time. They may be thermally coalesced between the non-oriented electrical steel sheets without gaps or pores by adjusting the temperature, pressure, and time conditions in the thermal coalescence.

The thermal coalescence includes a heating step and a coalescing step, and a heating rate of the heating step may be from 10° C./min to 1000° C./min.

Next, an adhesive layer is formed by performing stress relief annealing on the thermally coalesced non-oriented electrical steel sheets. The stress relief annealing may be performed at a temperature of 500 to 900° C. for 60 to 180 min.

The forming of the adhesive layer may be performed in a nitrogen ($N_2$) gas atmosphere.

Alternatively, the forming of the adhesive layer may be performed in a mixed gas atmosphere of 0.1 to 10 vol % of hydrogen ($H_2$) and 90 to 99.9 vol % of nitrogen ($N_2$).

Alternatively, the forming of the adhesive layer may be performed in a modified gas atmosphere containing 10 to 30 vol % of liquefied natural gas (LNG) and 70 to 90 vol % of air.

The forming of the adhesive layer may further include producing an oxide layer between the adhesive layer and the electrical steel sheet. Since the adhesive layer and the oxide layer have been described above, a duplicate description will be omitted.

When manufactured by the method for manufacturing the non-oriented electrical steel sheet product according to an exemplary embodiment of the present invention, the magnetism (in detail, iron loss and magnetic flux density) of the non-oriented electrical steel sheet may be improved after stress relief annealing, and high temperature adherence and high temperature oil resistance by the adhesive coating layer are excellent, and particularly, a surface characteristic and an attaching characteristic may not be deteriorated after the stress relief annealing. Specifically, after the stress relieving annealing, the adhesion force between the non-oriented electrical steel sheets may be 0.05 MPa or more.

Hereinafter, preferred examples of the present invention, comparative examples thereof, and evaluation examples thereof will be described. However, the following examples are only exemplary embodiments of the present invention, and the present invention is not limited thereto.

EXPERIMENTAL EXAMPLES

A non-directional electrical steel sheet (50×50 mm, 0.35 mmt) was prepared as a blank specimen. An adhesive coating solution configured with the components shown in following Table 1 was coated on an upper portion and a lower portion of the prepared blank specimen with a constant thickness (about 5.0 μm) by using a bar coater and a roll coater, the same was hardened for twenty seconds at 400° C., and then slowly cooled in the air to form an adhesive coating layer.

The electrical steel sheet on which the adhesive coating layer was coated were stacked to be 20 mm high, and they were pressurized with a force of 500 N to perform thermal coalescence to the same for 60 min at 220° C. Stress relief annealing was performed to the electrical steel sheet acquired in the coalescence condition at 780° C., which was a stress relief annealing condition, and in an atmosphere of 100 vol % of nitrogen. Adherence of the electrical steel sheet thermally coalesced for respective conditions and adherence on the respective electrical steel sheets having undergone the stress relief annealing by a shearing surface tension method were measured. Comparative Examples 1 and 2 exhibited surface characteristics of Cr-based and Cr-Free-based coating products.

The specific evaluation conditions are as follows.

Solution Stability:

The respective adhesive coating compositions are strongly agitated for thirty minutes by an agitator, and then maintained for 30 min without agitation. Next, it is determined depending on whether there is a precipitate or gel phenomenon in the composition.

Surface Characteristic:

Insulation, corrosion resistance, and close contacting property for the coating layer before the thermal coalescence formed by respective adhesive coating compositions were synthetically observed and estimated, and when the insulation, corrosion resistance, and close contacting property were good, it was expressed as excellent, when two of the items were good, it was expressed as good, when one of the items was good, it was expressed as normal, and when all of them were deteriorated, it was expressed as deteriorated.

Adherence:

Adherence before/after the stress relief annealing were measured by using a device for measuring a tensile force of stacked samples while pulling at a constant speed after fixing to an upper/lower jig with a constant force. In this case, the measured value was a measured point where an interface with minimum adherence was missed from among interfaces of the stacked samples.

The adherence before/after the stress relief annealing was estimated based on different references. When the measured adherence before stress relief annealing after the thermal coalescence was equal to or greater than 1.0 MPa, it was expressed as excellent, when the same was equal to or greater than 0.5 MPa, it was expressed as good, when the same was equal to or greater than 0.2 MPa, it was expressed as normal, and when the same was equal to or less than 0.1 MPa, it was expressed as deteriorated. In another way, when the measured adherence after the stress relief annealing was finished was equal to or greater than 0.5 MPa, it was expressed as excellent, when the same was equal to or greater than 0.2 MPa, it was expressed as good, when the same was equal to or greater than 0.1 MPa, it was expressed as normal, and when the same was equal to or less than 0.05 MPa, it was expressed as deteriorated.

TABLE 1

| | Adhesive coating composition | | | | | | Stability & surface characteristics | | | |
|---|---|---|---|---|---|---|---|---|---|---|
| | Water-soluble resin | | Metal phosphate | | Additive | | Composition | | Adherence | |
| | Type (weight ratio) | wt % | Type (weight ratio) | wt % | Type (weight ratio) | wt % | Stability | Surface Properties | Thermal coalescence | After SRA |
| Example 1 | Urethane | 60 | MCoP/MCP = 1/1 | 30 | MgO/Ca(OH)₂ = 1/1 | 10 | ◉ | ◉ | ○ | ○ |
| Example 2 | Acryl | 70 | MAP/MCoP = 1/1 | 25 | ZnO/Al(OH)₂ = 1/1 | 5 | ◉ | ◉ | ○ | Δ |
| Example 3 | Siloxane | 80 | MCoP/MCP = 1/1 | 18 | Carbon black/Mg(OH)2 = 1/1 | 2 | Δ | Δ | ◉ | ○ |
| Example 4 | Phenol | 60 | MCP/MMP = 1/1 | 35 | MgO/Ca(OH)₂ = 1/1 | 5 | ◉ | ◉ | Δ | Δ |
| Example 5 | Styrene | 70 | MAP/MCoP = 1/1 | 25 | KOH DELETEDTEXTS | 5 | ○ | ○ | ○ | Δ |
| Example 6 | Epoxy | 80 | MAP/MCoP = 1/1 | 17 | 3-glycidoxy propyltrimethoxysilane/H3BO₃ = 1/1 | 3 | ◉ | ◉ | ◉ | ○ |
| Example 7 | Vinyl | 60 | MCP/MMP = 1/1 | 35 | 3-glycidoxy propyltrimethoxysilane | 5 | ◉ | ◉ | Δ | ○ |

TABLE 1-continued

| | Adhesive coating composition | | | | | | Stability & surface characteristics | | | |
|---|---|---|---|---|---|---|---|---|---|---|
| | Water-soluble resin | | Metal phosphate | | Additive | | Composition | | Adherence | |
| | Type (weight ratio) | wt % | Type (weight ratio) | wt % | Type (weight ratio) | wt % | Stability wt % | Surface Properties | Thermal coalescence | After SRA |
| Example 8 | Ethylene | 70 | MCoP/MCP = 1/1 | 28 | CNT DELETEDTEXTS | 2 | Δ | Δ | ○ | Δ |
| Example 9 | Epoxy/siloxane = 1/1 | 80 | MAP DELETEDTEXTS | 18 | Carbon black | 2 | ○ | ○ | ◎ | Δ |
| Example 10 | Siloxane/acryl = 1/1 | 60 | MAP/MCoP/MZP = 1/1/1 | 37 | Phthalocyanine blue | 3 | ○ | ○ | Δ | ○ |
| Example 11 | Acryl/phenol = 1/1 | 70 | MCoP | 29 | CuO | 1 | ◎ | ◎ | ○ | Δ |
| Example 12 | Phenol/styrene = 1/1 | 80 | MCP DELETEDTEXTS | 15 | $Al_2O_3$ | 5 | ◎ | ◎ | ○ | Δ |
| Example 13 | Styrene/vinyl = 1/1 | 60 | MZP DELETEDTEXTS | 36 | $Fe_2O_3$ | 4 | ○ | ○ | ○ | Δ |
| Example 14 | Vinyl/ethylene = 1/1 | 70 | MMP DELETEDTEXTS | 20 | $Al(OH)_2$ | 10 | ◎ | ◎ | ○ | Δ |
| Example 15 | Ethylene/urethane = 1/1 | 80 | MAP DELETEDTEXTS | 17 | Phthalocyanine green/CNT = 1/1 | 3 | Δ | Δ | ◎ | Δ |
| Example 16 | Urethane/epoxy = 1/1 | 60 | MZP DELETEDTEXTS | 33 | $Fe_2O_3$/$Al(OH)_2$/$H_3PO_4$ = 1/1/1 | 7 | ◎ | ◎ | Δ | Δ |
| Example 17 | Epoxy/siloxane/acryl = 1/1/1 | 70 | MAP/MCoP/MZP = 1/1/1 | 26 | $Mg(OH)_2$/$H_3BO_3$ = 1/1 | 4 | ○ | ◎ | ◎ | ○ |
| Example 18 | Styrene/vinyl/ethylene = 1/1/1 | 80 | MAP/MCoP = 1/1 | 15 | Carbon black/CaO/NaOH = 1/1/1 | 5 | ○ | Δ | ○ | Δ |
| Example 19 | Urethane/epoxy/acryl = 1//1/1 | 60 | MAP/MCoP = 1/1 | 30 | Phthalocyanine blue/Al(OH)2 = 1/1 | 10 | ◎ | ◎ | Δ | ○ |
| Example 20 | Epoxy | 80 | MAP/MCoP = 1/1 | 20 | — | — | ◎ | ◎ | ○ | Δ |
| Example 21 | Epoxy/siloxane/acryl = 1/1/1 | 70 | MAP/MCoP/MZP = 1/1/1 | 30 | — | — | ○ | ◎ | ○ | Δ |
| Comparative Example 1 | Acryl-styrene | — | Chromate | — | — | — | ◎ | ○ | X | X |
| Comparative Example 2 | Acryl/epoxy | — | Phosphate | — | — | — | ◎ | ○ | X | X |

[Property test/Excellent: ◎, Good: ○, Normal: Δ, Deteriorated: X]
MAP = Al $(H_3PO_4)_2$, MCoP = (Co $(H_3PO_4)_2$, MCP = Ca $(H_3PO_4)_2$, MZP = Zn $(H_3PO_4)_2$, MMP = Mg $(H_3PO_4)_2$ As can be seen in Table 1, the solution stability of the adhesive coating composition configured with an organic/inorganic composite, a metal phosphate, and an additive shows a somewhat deteriorated trend when CNT or carbon black (Examples 8 and 9) are added, and another additive excluding the CNT and the carbon black generally has good solution stability with the water-soluble resin and the metal phosphate.

The thermal coalescence is performed under the same conditions including the temperature of 220° C., the pressurization of 500 Kgf, and the pressurizing time of 60 min, and the adherence is then estimated. In general, as an injected content of the metal phosphate and the additive increases, adherence after the thermal coalescence is slightly deteriorated.

The adherence is estimated after stress relief annealing is performed to the thermally coalesced electrical steel sheet at the stress relief annealing temperature of 780° C., for the stress relief annealing time of 120 min, and in the atmosphere of $N_2$ of 100 vol %. The adherence after the stress relief annealing has a trend of being relatively deteriorated, compared to the adherence before the stress relief annealing. This is analyzed as being because the water-soluble resin is decomposed in the high-temperature stress relief annealing process, a pore exists between single sheets, and the adherence is relatively reduced. However, a gap between the single sheets is very densely attached by the thermal coalescence before the stress relief annealing process to prevent the atmosphere (nitrogen, oxygen, or carbon monoxide) from permeating, and minimize the loss of the decomposed resin, thereby maintaining the adherence between bonding layers of single electrical steel sheets. Further, in the high temperature atmosphere, the water-soluble resin is decomposed, an oxide layer is formed between the interface of the electrical steel sheet and the attachable coating, and the oxide grows in the stress relief annealing process, so the adherence between the single-piece electrical steel sheets is improved after the stress relief annealing.

Figure 4:
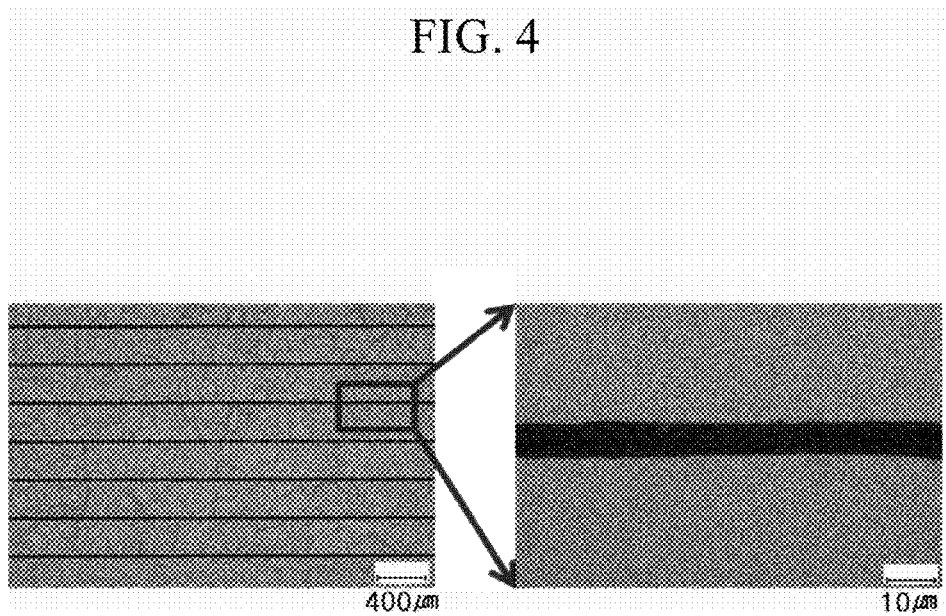
FIG. 4 illustrates a scanning electron microscope (SEM) photograph of a cross-section of an electrical steel sheet after thermal coalescence in Example 1.

FIG. 4 illustrates a photograph of a cross-section of an electrical steel sheet product taken by a scanning electron microscope (SEM) after thermal coalescence is finished (before an SRA process) in Example 1.

Referring to FIG. 4, in Example 1, a cross-section of a product having undergone a thermal coalescence process is observed to be fused in the thermal coalescence layer without an empty space. It is confirmed that the thermal coalescence layer has a thickness of 5.5 to 5.6 μm.

Figure 5:
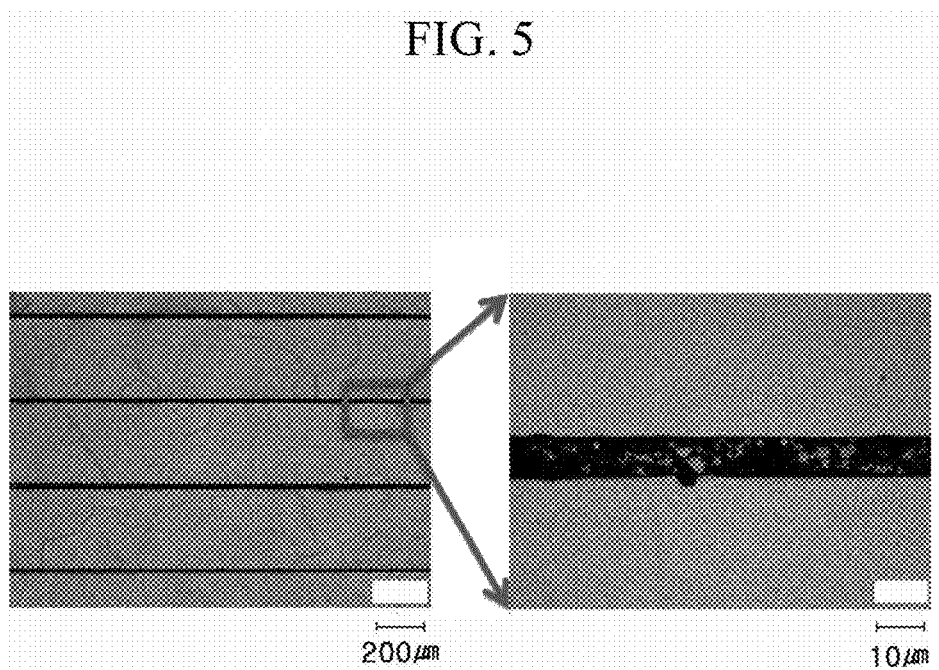
FIG. 5 illustrates a scanning electron microscope (SEM) photograph of a cross-section of an electrical steel sheet after stress relief annealing in Example 1.

FIG. 5 illustrates a scanning electron microscope (SEM) photograph of a cross-section of an electrical steel sheet after stress relief annealing in Example 1. It can be confirmed that less of a void is formed by the stress relief annealing in the nitrogen atmosphere and a dense adhesive layer is formed.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described exemplary embodiments are for illustrative purposes only, and the scope of the present invention is not limited thereto.

| <Description of Symbols> | |
| --- | --- |
| 100: Non-oriented electrical steel plate product | 10: Non-oriented electrical steel sheet |
| 20: oxide layer | 30: adhesive layer |

The invention claimed is:

1. An adhesive coating composition for a non-oriented electrical steel sheet, the composition consisting of:
    40 to 99 wt % of a water-soluble resin; and
    1 to 60 wt % of a composite metal phosphate,
    wherein the water-soluble resin has an aromatic functional group and is at least one selected from an epoxy-based resin, a siloxane-based resin, an acrylic-based resin, a phenol-based resin, a styrene-based resin, a vinyl-based resin, an ethylene-based resin, and a urethane-based resin, and
    the composite metal phosphate is at least one selected from a primary aluminum phosphate ($Al(H_3PO_4)_3$), a primary cobalt phosphate ($Co(H_3PO_4)_2$), a primary calcium phosphate ($Ca(H_3PO_4)_2$), a primary zinc phosphate ($Zn(H_3PO_4)_2$), and a primary magnesium phosphate ($Mg(H_3PO_4)_2$).

2. The adhesive coating composition of claim 1, wherein the water-soluble resin includes at least one functional group selected from benzene, toluene, xylene, naphthalene, anthracene, and benzopyrene.

3. The adhesive coating composition of claim 1, wherein a solid content of the water-soluble resin is 50 wt %, and the water-soluble resin has a weight average molecular weight of 1000 to 100,000 and glass transition temperature (Tg) of 30 to 150° C.

* * * * *